US012400818B2

(12) United States Patent
Yoneda

(10) Patent No.: US 12,400,818 B2
(45) Date of Patent: Aug. 26, 2025

(54) FUSE DEVICE

(71) Applicant: DEXERIALS CORPORATION, Tokyo (JP)

(72) Inventor: Yoshihiro Yoneda, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/960,278

(22) PCT Filed: Dec. 7, 2018

(86) PCT No.: PCT/JP2018/045172
§ 371 (c)(1),
(2) Date: Jul. 6, 2020

(87) PCT Pub. No.: WO2019/138752
PCT Pub. Date: Jul. 18, 2019

(65) Prior Publication Data

US 2021/0074502 A1 Mar. 11, 2021

(30) Foreign Application Priority Data

Jan. 10, 2018 (JP) ................................ 2018-001900

(51) Int. Cl.
*H01H 85/17* (2006.01)
*H01H 85/06* (2006.01)
*H01H 85/11* (2006.01)

(52) U.S. Cl.
CPC ............ *H01H 85/17* (2013.01); *H01H 85/06* (2013.01); *H01H 85/11* (2013.01)

(58) Field of Classification Search
CPC ........ H01H 85/17; H01H 85/06; H01H 85/11; H01H 85/0056; H01H 85/0047;
(Continued)

(56) References Cited

U.S. PATENT DOCUMENTS 4,562,322 A * 12/1985 Yamaguchi .......... H01H 33/021
174/110 N
4,608,548 A * 8/1986 Borzoni ............. H01H 85/0417
337/201
(Continued)

FOREIGN PATENT DOCUMENTS

CN 1981355 A * 6/2007 ............. H01H 33/73
CN 106796857 A 5/2017
(Continued)

OTHER PUBLICATIONS

Yoneda Yoshihiro; Furuuchi Yuji; Sakakibara Kazuyuki, "Fuse Element, Fuse Device, Protective Device, Short-Circuit Device, Switching Device", Dec. 8, 2016, Dexerials Corp., Entire Document (Translation of WO 2016195108) (Year: 2016).*
(Continued)

*Primary Examiner* — Stephen S Sul
(74) *Attorney, Agent, or Firm* — Paratus Law Group, PLLC

(57) ABSTRACT

Provided is a fuse device capable of maintaining the insulation performance while using a fuse element having a considerable size to improve rating. The fuse device includes a fuse element 2 and a case 3 for housing the fuse element 2, and the case 3 has a resin portion 4 having a surface to be melted by heat accompanying blowout of the fuse element 2 on at least a part of an inner wall surface 8*a* facing the inside 8 housing the fuse element 2.

26 Claims, 13 Drawing Sheets

(58) Field of Classification Search
CPC ........... H01H 85/0078; H01H 85/0411; H01H 37/76; H01H 85/05
See application file for complete search history.

(56) References Cited

U.S. PATENT DOCUMENTS

| | | | | | |
|---|---|---|---|---|---|
| 4,760,367 | A * | 7/1988 | Williams | H01H 85/30 | 337/241 |
| 4,963,850 | A * | 10/1990 | Ranjan | H01H 85/17 | 337/273 |
| 5,841,088 | A * | 11/1998 | Yamaguchi | H01H 9/302 | 218/158 |
| 5,990,440 | A * | 11/1999 | Yamaguchi | H01H 9/302 | 218/34 |
| 6,030,257 | A | 2/2000 | Furuya | | |
| 6,570,481 | B2 * | 5/2003 | Katsube | H01H 71/02 | 335/23 |
| 6,967,560 | B2 * | 11/2005 | Andoh | H01H 85/17 | 337/198 |
| 7,592,892 | B2 * | 9/2009 | Ito | H01H 85/045 | 337/159 |
| 2004/0070485 | A1 | 4/2004 | Andoh et al. | | |
| 2007/0075822 | A1 * | 4/2007 | Pachla | H01H 85/0411 | 337/297 |
| 2010/0207716 | A1 * | 8/2010 | Yen | H01H 69/02 | 337/159 |
| 2012/0133478 | A1 * | 5/2012 | Chiu | H01H 85/165 | 337/228 |
| 2014/0133059 | A1 * | 5/2014 | Wang | H01H 85/0047 | 361/103 |
| 2015/0084734 | A1 * | 3/2015 | Yoneda | H01H 85/06 | 337/183 |
| 2015/0280204 | A1 * | 10/2015 | Byun | H01M 50/581 | 429/61 |
| 2016/0013001 | A1 * | 1/2016 | Yoneda | H01H 85/11 | 337/227 |
| 2016/0071680 | A1 * | 3/2016 | Mukai | H01H 37/761 | 337/183 |
| 2016/0172143 | A1 * | 6/2016 | Yoneda | H01H 85/20 | 337/186 |
| 2016/0240342 | A1 * | 8/2016 | Yoneda | H01H 85/12 | |
| 2017/0117640 | A1 * | 4/2017 | Arenburg | H01R 4/34 | |

FOREIGN PATENT DOCUMENTS

| | | | | |
|---|---|---|---|---|
| JP | H10-255642 | A | 9/1998 | |
| JP | 2014-209467 | A | 11/2014 | |
| JP | 2014-220044 | A | 11/2014 | |
| JP | 2015-065156 | A | 4/2015 | |
| JP | 2016-062649 | A | 4/2016 | |
| JP | 2017-147162 | A | 8/2017 | |
| TW | 201621952 | A | 6/2016 | |
| TW | I600042 | B | 9/2017 | |
| WO | WO 02/43097 | A1 | 5/2002 | |
| WO | WO 2016/039208 | A1 | 3/2016 | |
| WO | WO-2016195108 | A1 * | 12/2016 | H01H 37/04 |

OTHER PUBLICATIONS

Moore Jeffrey, "Arc-extinguishing composition and articles manufactured therefrom", Jun. 13, 2007, S&C Electric Co., Entire Document (Translation of CN 1981355) (Year: 2007).*
"FEP", Oct. 29, 2012, Holscot, Entire Document (https://holscot.com/glossary/fep-is-a-type-of-fluoropolymer-that-shares-similarities-with-other-fluoropolymers-like-pfa/). (Year: 2012).*
"PFA", Jan. 12, 2014, Holscot, Entire Document (https://holscot.com/glossary/pfa/) (Year: 2014).*
Oct. 5, 2021, Japanese Office Action issued for related JP application No. 2018-001900.
Feb. 18, 2022, Korean Office Action issued for related KR Application No. 10-2020-7018428.
Jan. 4, 2022, Chinese Office Action issued for related CN Application No. 201880083914.5.
Jul. 20, 2022, Chinese Office Action issued for related CN Application No. 201880083914.5.
Oct. 4, 2022, Taiwanese Office Action issued for related TW Application No. 108100996.
Jan. 20, 2023, Chinese Office Action issued for related CN Application No. 201880083914.5.
Nov. 18, 2022, Chinese Office Action issued for related CN Application No. 201880083914.5.
Apr. 28, 2023, Chinese Office Action issued for related CN Application No. 201880083914.5.

* cited by examiner

FUSE DEVICE

CROSS REFERENCE TO PRIOR APPLICATION

This application is a National Stage Patent Application of PCT International Patent Application No. PCT/JP2018/045172 filed on Dec. 7, 2018 under 35 U.S.C. § 371, which claims priority on the basis of Japanese Patent Application No. 2018-001900, filed on Jan. 10, 2018 in Japan, which are all hereby incorporated by reference in their entirety.

TECHNICAL FIELD

The present technology relates to a fuse device mounted on a current path, which blows out a fuse element by self-heating when a rate-exceeding current flows to interrupt the current path, and specifically relates to a fuse device that can be used for high rating and high current applications.

BACKGROUND ART

Conventionally, fuse elements blown by self-heating when a rate-exceeding current flows are used to interrupt a current path. Examples of commonly used fuse elements include holder-fixed fuses having solder enclosed in glass tubes, chip fuses having an Ag electrode printed on a ceramic substrate surface, and screw-in or insertable fuses having a copper electrode with a narrow portion assembled into a plastic case.

However, problems have been identified in existing fuse elements described above such as inability to surface mount using reflow, low current ratings, and inferior blowout speeds when increasing size for higher current ratings.

In general, a reflow-mountable rapid-interruption fuse device preferably has a high melting point Pb solder with a melting point of 300° C. or more in the fuse element from the viewpoint of blowout properties. However, use of solder containing Pb is limited with few exceptions under the RoHS directive, and demand for Pb-free products is expected to increase in the future.

Thus, there is a need to develop a fuse element in which ratings can be increased for application to large currents, and high-speed blowout property of rapidly interrupting a current path when a rate-exceeding current flows therethrough is achieved.

Therefore, a fuse device has been proposed in which, on an insulating substrate provided with a first and second electrodes, a fuse element is mounted between the first and second electrodes (see PLT 1).

By mounting the fuse device described in PLT 1 onto a circuit board, the fuse element is connected between the first and second electrodes to be incorporated in a part of the current path, and when a current higher than the rated current flows, the self-heating causes blowout of the fuse element to interrupt the current path.

CITATION LIST

Patent Literature

PLT 1: Japanese Unexamined Patent Application No. 2014-209467

SUMMARY OF INVENTION

Technical Problem

Here, the application of this type of fuse device is extended from electronic appliances to high current applications such as industrial machines, electric bicycles, electric bikes, and cars, among others. Therefore, with the increase in capacity and rating of electronic appliances and battery packs to be mounted, fuse devices are required to further improve the current rating.

In order to increase the current rating, it is effective to reduce the resistance by increasing the size of the fuse element. However, in order to raise the current rating of the fuse device, it is necessary to balance the reduction of the conductor resistance of the fuse element with the insulation performance for interruption. That is, in order to allow more current to flow, it is necessary to reduce the conductor resistance, and therefore, it is necessary to increase the cross-sectional area of the fuse element. However, as shown in FIGS. 15 (A) and (B), arc discharge occurred when the current path is interrupted scatters the metal body **80*a* constituting the fuse element 80 to the surroundings, and there is a risk that a current path 81** could be newly formed; increasing cross-sectional area of a fuse element also increases such a risk.

Most of cases for housing the fuse element 80 of high current rating is made of ceramic materials since the ceramic materials have high thermal conductivity and efficiently captures the high-temperature melted and scattered material of the fuse element 80 (cold trap), thereby forming a continuous conduction path on the inner wall of the case.

In addition, any of the conventional high voltage compatible current fuses requires complicated materials and processes such as encapsulation of an arc-extinguishing agent and manufacture of a spiral fuse, which are disadvantageous in terms of miniaturization of a fuse device and high rating of current.

As described above, it is desired to develop a fuse device capable of maintaining the insulation performance while using a fuse element having a considerable size for increasing the rating and of realizing miniaturization and simplification of the manufacturing process with a simple configuration.

Solution to Problem

In order to solve the problems described above, a fuse device according to the present technology includes: a fuse element; and a case for housing the fuse element, wherein the case includes a resin portion having a surface to be melted by heat accompanying blowout of the fuse element on at least a part of an inner wall surface facing the inside for housing the fuse element.

In addition, a fuse device according to the present technology includes: a fuse element; and a case for housing the fuse element, wherein the case includes a resin portion for capturing the melted and scattered material of the fuse element on at least a part of an inner wall surface facing the inside for housing the fuse element.

Advantageous Effects of Invention

According to the present technology, since a resin portion for capturing the melted and scattered material of the fuse element is provided on at least a part of the inner wall surface of the case for housing the fuse element, the resin portion captures the melted and scattered material and prevents the material from being continuously adhered to the inner wall surface reaching both ends in the current flow direction of the fuse element. Therefore, the present technology prevents both ends of the blown fuse element from being short-circuited due to continuous adhesion of the melted and scattered material to the inner wall surface of the case.

DESCRIPTION OF EMBODIMENTS

Figure 1A:
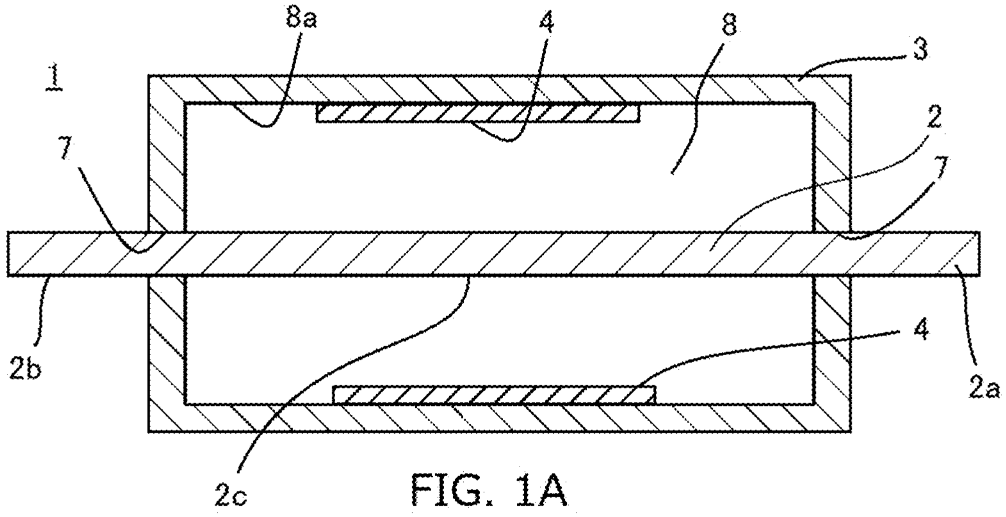
FIG. 1 is a cross-sectional view of a fuse device according to the present technology, with (A) illustrating a state before the fuse element is blown and (B) illustrating a state after the fuse element is blown.

Hereinafter, a fuse device according to the present technology will be described in detail with reference to the accompanying drawings. It should be noted that the present technology is not limited to the following embodiments and various modifications can be made without departing from the scope of the present technology. Moreover, the features illustrated in the drawings are shown schematically and are not intended to be drawn to scale. Actual dimensions should be determined in consideration of the following description. Furthermore, those skilled in the art will appreciate that dimensional relations and proportions may be different among the drawings in certain parts.

Fuse Device

A fuse device 1 according to the present technology realizes a compact and highly rated fuse device, by having a small planar size of 3 to 5 mm×5 to 10 mm and a height of 2 to 5 mm, while having a resistance of 0.2 to 1 mΩ, and a high current rating of 50 to 150 A. It is a matter of course that the present disclosure can be applied to a fuse device having any size, resistance value, and current rating.

Figure 1B:
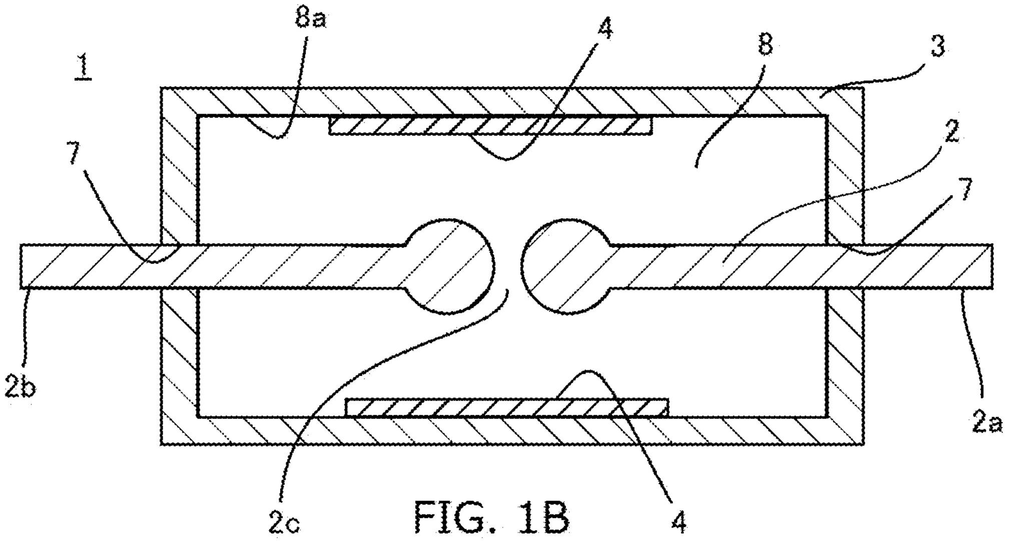

As shown in FIGS. 1 (A) and (B), the fuse device 1 according to the present technology includes a fuse element 2 and a case 3 for housing the fuse element 2. In the fuse device 1, both ends in the current flowing direction of the fuse element 2 are led out from lead-out ports 7 of the case 3. Both ends of the fuse element 2 led out from the lead-out ports 7 constitute terminals 2*a*, 2*b* extending outwardly and connected to connection electrodes of an external circuit (not shown). The terminals 2*a*, 2*b* of the fuse device 1 are connected to terminals of a circuit in which the fuse device 1 is incorporated, thereby constituting a part of a current path of the circuit. When a rate exceeding current flows through the fuse element 2, the fuse element 2 is blown by self-generated heat (Joule heat) and interrupts the current path of the circuit in which the fuse device 1 is incorporated.

It should be noted that the terminals 2*a*, 2*b* of the fuse element 2 and the connection electrode of the external circuit may be connected by a known method such as solder connection. Furthermore, the terminals 2*a*, 2*b* of the fuse device 1 may be connected to a metal plate serving as an external connection terminal capable of coping with a large current. The terminals 2*a*, 2*b* of the fuse element 2 may be connected to a metal plate with a connecting material such as solder, the terminals 2*a*, 2*b* may be held between clamp terminals connected to the metal plate, or the terminals 2*a*, 2*b* or the clamp terminals may be fixed to the metal plate with screws having conductivity.

Case

The case 3 can be formed of an insulating member such as an engineering plastic, alumina, glass ceramics, mullite, or zirconia, and the case 3 is manufactured by a manufacturing method such as molding or powder molding in accordance with the material.

In addition, as shown in FIG. 1, the case 3 is provided with the lead-out ports 7 for leading out both ends of the housed fuse element 2 in the current flowing direction. The lead-out ports 7 are formed in opposed wall of the case 3 and support both ends in the current flowing direction of the fuse element 2, thereby supporting the fuse element 2 in a housing space 8 of the case 3 in a bridge-like manner.

The case 3 is preferably formed of a ceramic material having a relatively high thermal conductivity such as alumina. By using a ceramic material excellent in thermal conductivity, the case 3 efficiently radiates heat generated by the fuse element 2 due to the overcurrent to the outside, and locally overheats and blows the fuse element 2 supported in a bridge-like manner. Therefore, the fuse element 2 melts only at a limited portion, and the amount of melted and scattered material and the area of the adhesion region are also limited.

Resin Portion

The case 3 for housing the fuse element 2 has a housing space 8 for housing the fuse element 2, and at least a part of an inner wall surface 8*a* facing the fuse element 2 is provided with a resin portion 4 for capturing melted and scattered material generated when the fuse element 2 blows. The resin portion 4 is formed, for example, on the inner wall surface 8*a* at a position facing the center position in the current flowing direction of the fuse element 2 housed in the case 3 over a direction orthogonal to the current flowing direction of the fuse element 2, that is, over the entire circumference of the inner wall surface 8*a* surrounding the periphery of the fuse element 2. Thus, the resin portion 4 is formed so as to shield the inner wall surface 8*a* extending between the pair of lead-out ports 7, 7 for supporting the fuse element 2 in a bridge-like manner in the housing space 8 in a direction orthogonal to the current flowing direction of the fuse element.

Figure 2A:
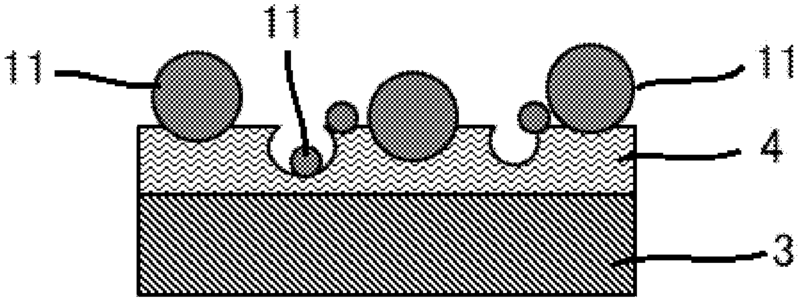
FIG. 2 (A) is a cross-sectional view showing a state in which melted and scattered material is captured by a resin portion, and FIG. 2 (B) is a cross-sectional view showing a state in which a melted and scattered material accumulation layer is formed on the inner wall surface of the case without providing the resin portion.
Figure 2B:
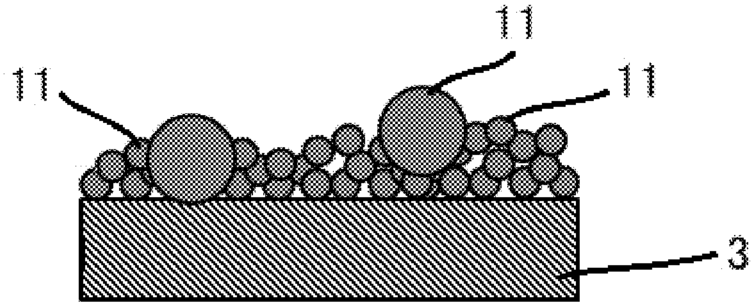

As shown in FIG. 2 (A), the resin portion 4 captures the melted and scattered material 11 when high-temperature melted and scattered material 11 adheres thereto at the time of blowout of the fuse element 2 and is melted by radiant heat accompanying the blowout and the high temperature of the melted and scattered material 11, and a part of a large amount of the melted and scattered material 11 enters inside the resin portion 4.

Further, on the surface of the resin portion 4, the melted and scattered material 11 is less likely to be cooled than the ceramic material, and the melted and scattered material 11 is agglomerated and enlarged by the heat of the melted and scattered material 11 itself or radiation heat accompanying the blowout of the fuse element 2. Further, a part of the melted and scattered material 11 captured by the repeated scattered flow of the melted and scattered material 11 is discharged.

Thus, the melted and scattered material 11 accumulated on the resin portion 4 in the case 3 is prevented from being continued; the resin portion 4, therefore, electrically interrupts the path between both ends of the fuse element 2 led out from the lead-out ports 7. Therefore, even when the melted and scattered material 11 of the fuse element 2 adheres to the inner wall surface 8*a* of the case 3, the fuse device 1 can prevent the situation that both ends in the current flow direction of the fuse element 2 are short-circuited by the melted and scattered material 11 of the fuse element 2 and can maintain high insulation resistance.

The resin portion 4 is formed using a material that captures the melted and scattered material 11 at a high temperature and melts by the high temperature of the melted and scattered material 11, with a part of the melted and scattered material 11 entering the resin portion 4; the material forming the resin portion 4 preferably has a melting point of 400° C. or lower, more preferably a reflow temperature (for example, 260° C.) or higher, or preferably has a thermal conductivity of 1 W/m*K or lower.

As the material of the resin portion 4, for example, a nylon resin material (nylon 46, nylon 66, nylon 6, nylon 4T, nylon 6T, nylon 9T, and nylon 10T, among others) or a fluorine resin material (PTFE, PFA, FEP, ETFE, EFEP, CPT, and PCTFE, among others) can be used.

The resin portion 4 can be formed on the inner wall surface 8*a* of the case 3 by coating, printing, vapor deposition, sputtering, or any other known method of forming a resin film or a resin layer, depending on the material. The resin portion 4 may be formed of one kind of resin material or may be formed by laminating a plurality of kinds of resin materials.

It should be noted that, as shown in FIG. 1, the resin portion 4 is formed at a position facing the center position in the current flowing direction of the fuse element 2, whereby achieving efficient insulation. When an overcurrent exceeding the rating flows to cause self-heating, the fuse element radiates heat from the lead-out ports 7 supporting both ends in the current flow direction of the fuse element 2, the fuse element is likely overheated and blown out at the center position in the current flow direction of the fuse element 2 farthest from the lead-out ports 7. Therefore, by disposing the resin portion 4 at a position facing the center position, the melted and scattered material 11 can be surely captured.

Figure 3A:
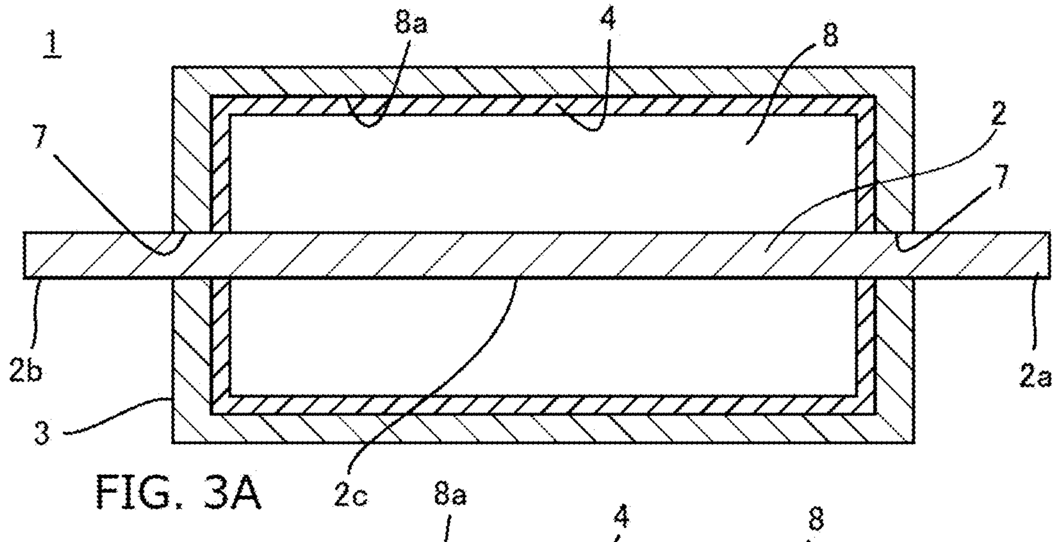
FIG. 3 is a cross-sectional view showing a variation of a fuse device according to the present technology, with (A) illustrating a state before the fuse element is blown and (B) illustrating a state after the fuse element is blown.
Figure 3B:
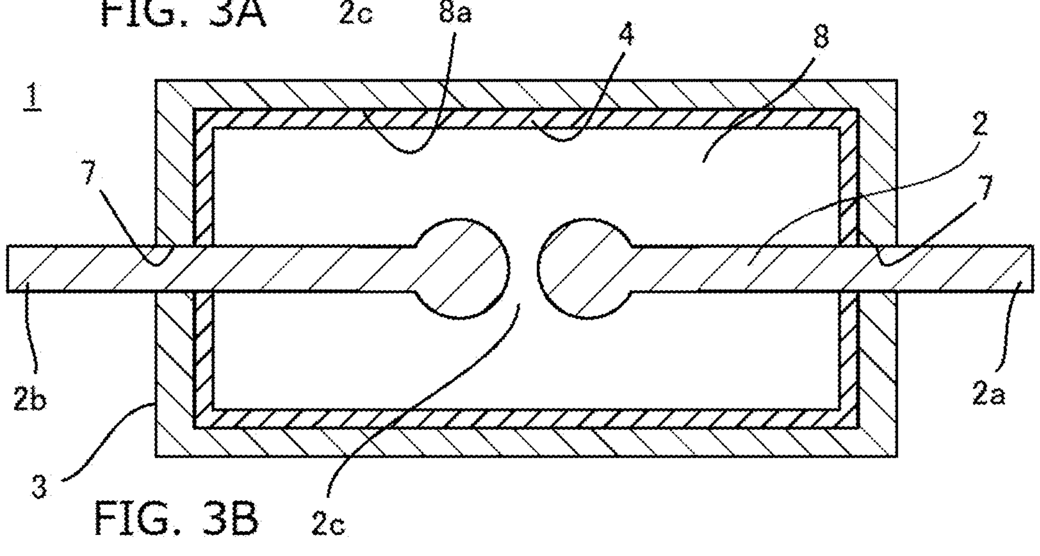

As shown in FIGS. 3 (A) and (B), the resin portion 4 may be formed over the entire inner wall surface 8*a* of the case 3. Alternatively, the formation position and the formation pattern of the resin portion 4 formed on the inner wall surface 8*a* of the case 3 can be arbitrarily designed.

Tracking Resistance

In accordance with increase in the current rating of the fuse element 2, the amount of heat generated by the fuse element 2 at the time of self-heat generation interruption due to the overcurrent increases; therefore, the thermal influence on the case 3 also increases. For example, when the current rating of the fuse device is raised to the 100 A level and the rated voltage is raised to the 60 V level, there are concerns that the surface or the resin portion 4 of the case 3 facing the fuse element 2 are carbonized by arc discharge at the time of current interruption, causing leakage current to reduce insulation resistance, the element housing is broken by ignition, or the element housing is displaced or dropped from the mounting substrate.

In order to shut off the circuit by quickly stopping the arc discharge, there have been proposed an arc extinguishing agent filled in the hollow case, and a current fuse for a high voltage which generates a time lag by spirally winding a fuse element around a heat dissipating material. However, any of the conventional high voltage current fuses requires complicated materials and processes such as encapsulation of an arc-extinguishing agent and manufacture of a spiral fuse, which are disadvantageous in terms of miniaturization of a fuse device and high rating of current.

Therefore, in the fuse device 1, the resin portion 4 is preferably formed of a material having a tracking resistance of 250 V or more. Thus, even when overcurrent caused by increased current rating increases the scale of the arc discharge at the time of interruption of heat generation, the reduction of the insulation resistance caused by leakage current due to the carbonization of the resin portion 4 and the breakage of the case 3 due to ignition can be prevented.

The resin portion 4 is preferably formed of a nylon material as a material having tracking resistance. By using a nylon-based plastic material, the tracking resistance of the resin portion 4 can be 250 V or more. The tracking resistance can be measured by testing according to IEC 60112.

Among the nylon-based plastic materials constituting the resin portion 4, nylon 46, nylon 6T, and nylon 9T are preferably used. Thus, the tracking resistance of the resin portion 4 can be improved to 600 V or more.

Insulation Resistance

Further, as described above, the case 3 is preferably formed of a ceramic material having an excellent thermal conductivity in order for the fuse element 2 supported in a bridge-like manner to be locally heated and blown out thereby limiting the amount of melted and scattered material and adhesion area. However, due to its excellent thermal conductivity, the case 3 made of a ceramic material is cooled rapidly when the high-temperature melted and scattered material 11 adheres to the inner wall surface 8*a* of the case 3, and as shown in FIG. 2 (B), a deposited layer of the melted and scattered material 11 is easily formed; therefore, there is a possibility that leak current flows between the terminals 2*a*, 2*b* of the fuse element 2 through the deposited melted and scattered material 11.

For this reason, as shown in FIG. 2 (A), the fuse device 1 captures the melted and scattered material 11 by forming the resin portion 4, and the resin portion 4 is melted together with the melted and scattered material 11 by radiant heat accompanying the blowout and high temperature of the melted and scattered material 11, thereby suppressing the formation of a deposited layer by the melted and scattered material 11.

That is, the fuse device 1 can locally heat and blow the fuse element 2 supported in a bridge-like manner to limit the amount of melted and scattered material and the adhesion region by using the case 3 made of a ceramic material, while maintaining a high insulation resistance (for example, $10^{13}$ kΩ level) by preventing the formation of a deposited layer of the melted and scattered material 11 and the occurrence of leakage current with the resin portion 4 melted while capturing the melted and scattered material 11.

EXAMPLES

Figure 4A:
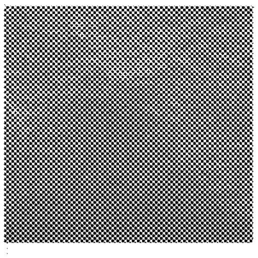
FIG. 4 (A) is an SEM image of an inner wall surface of a case made of alumina (ceramic material), FIG. 4 (B) is an SEM image of a state in which the melted and scattered material of the fuse element adheres to the case made of alumina (ceramic material), and FIG. 4 (C) is an SEM image of a state in which the melted and scattered material of the fuse element adheres to the case made of alumina (ceramic material) in an enlarged manner.
Figure 4B:
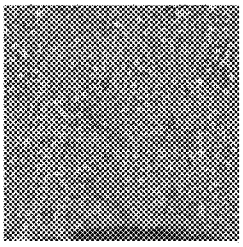
Figure 4C:
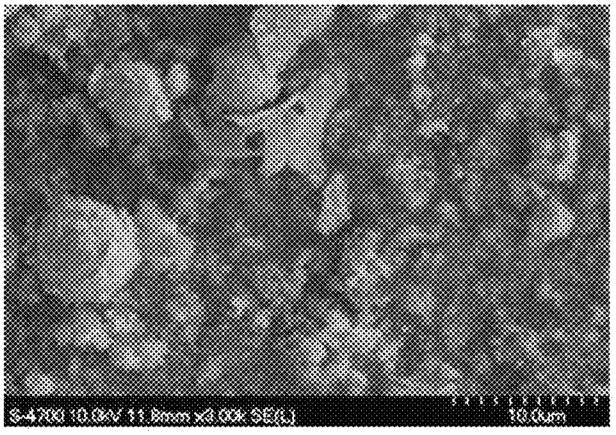
Figure 5A:
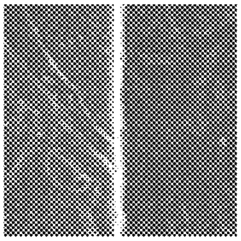
FIG. 5 (A) is an SEM image of an inner wall surface of a case made of nylon 46 (nylon resin material), FIG. 5 (B) is an SEM image of a state in which melted and scattered material of the fuse element adheres to the case made of nylon 46 (nylon resin material), and FIG. 5 (C) is an SEM image of a state in which melted and scattered material of the fuse element adheres to the case made of nylon 46 (nylon resin material) in an enlarged manner.
Figure 5B:
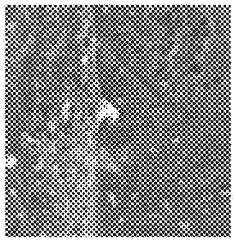
Figure 5C:
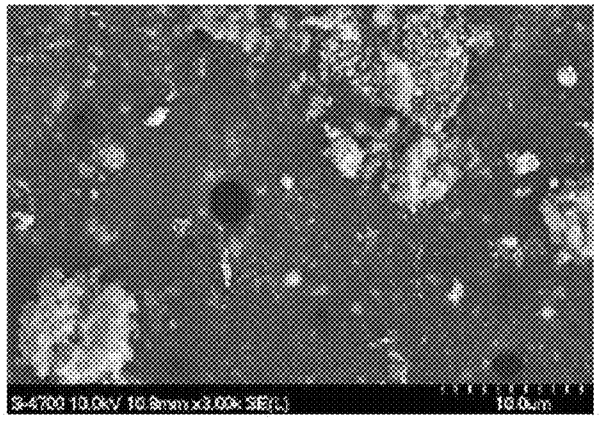

FIG. 4 (A) is an SEM image of an inner wall surface of a case made of alumina (ceramic material), FIG. 4 (B) is an SEM image of a state in which the melted and scattered material 11 of the fuse element 2 adheres to the case made of alumina (ceramic material), and FIG. 4 (C) is an SEM image of a state in which the melted and scattered material 11 of the fuse element 2 adheres to the case made of alumina (ceramic material) in an enlarged manner. FIG. 5 (A) is an SEM image of an inner wall surface of a case made of nylon 46 (nylon resin material), FIG. 5 (B) is an SEM image of a state in which the melted and scattered material 11 of the fuse element 2 adheres to the case made of nylon 46 (nylon resin material), and FIG. 5 (C) is an SEM image of a state in which the melted and scattered material 11 of the fuse element 2 adheres to the case made of nylon 46 (nylon resin material) in an enlarged manner.

As shown in FIGS. 4 (B) and (C), it can be seen that the melted and scattered material 11 is closely adhered to the alumina surface to form a deposited layer.

On the contrary, as shown in FIGS. 5 (B) and (C), it can be seen that the melted and scattered material 11 of the fuse element 2 are loosely adhered to the surface of the nylon 46, and that voids are formed in the surface of the nylon 46 melted by radiant heat accompanying the blowout and heat of the melted and scattered material 11. As a result, the melted and scattered material 11 is not continuously deposited on the surface of the resin material, and the melted and scattered material 11 enters into the voids formed by the depression of the resin material, whereby suppressing formation of a path of leakage current.

According to the actual measurement of the insulation resistance of the cases shown in FIGS. 4 and 5 (measurement condition: 300 A/62 V), the insulation resistance of the alumina case shown in FIG. 4 dropped to 80 kΩ, while the insulation resistance of the nylon 46 case shown in FIG. 5 was $1.8\times10^{13}$ kΩ.

Although the case made of nylon 46 has an excellent insulation resistance, resins such as nylon 46 has low thermal conductivity and cannot efficiently dissipate heat generated by the fuse element 2, so that the fusing area of the fuse element 2 is wide. As a result, a large amount of melted and scattered material 11 was scattered, and the area where the melted and scattered material adhered to the inner surface of the case was wide. Therefore, when increasing the rating and miniaturizing a fuse device, in order to maintain the high insulation resistance, it is desirable to minimize the amount of melted and scattered material 11 and to limit the adhesion area to the inner surface of the case.

In this regard, as described above, the fuse device 1 is advantageous in that, by using the case 3 made of a ceramic material, the fuse element 2 held in a bridge-like manner is locally heated and blown, and the amount and adhesion region of the melted and scattered material are limited, and the melted and scattered material 11 is captured by the resin portion 4, and the resin portion 4 is melted, thereby preventing the formation of a deposited layer of the melted and scattered material 11, preventing the occurrence of a leak current, and maintaining a high insulation resistance (for example, $10^{13}$ kΩ level).

Fuse Element

Figure 6A:
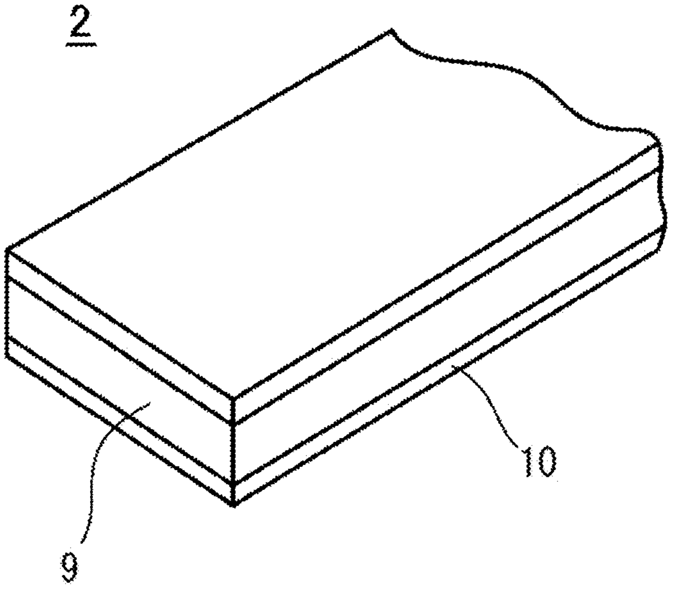
FIG. 6 (A) is an external perspective view showing a fuse element having a laminated structure in which a high melting point metal layer is laminated on upper and lower surfaces of a low melting point metal layer, and FIG. 6 (B) is an external perspective view showing a fuse element having a covering structure in which a low melting point metal layer is exposed from both end surfaces and the outer periphery is covered with a high melting point metal layer.
Figure 6B:
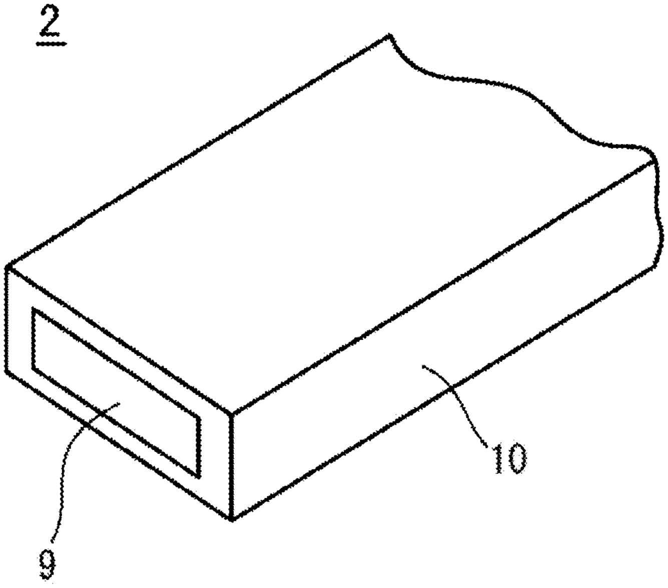

Next, the fuse element 2 will be explained. The fuse element 2 is a low melting point metal such as solder or Pb-free solder containing Sn as a main component, or a laminate of a low melting point metal and a high melting point metal. For example, as shown in FIG. 6, the fuse element 2 is formed as a laminated structure comprising an inner layer and an outer layer, and has a low melting point metal layer 9 as an inner layer and a high melting point metal layer 10 as an outer layer laminated on the low melting point metal layer 9.

The low melting point metal layer 9 is preferably a metal containing Sn as a main component and is generally referred to as “Pb-free solder”. The melting point of the low melting point metal layer 9 is not necessarily higher than the reflow temperature (for example, 260° C.), and may melt at about 200° C. The high melting point metal layer 10 is a metal layer laminated on the surface of the low melting point metal layer 9 made of, for example, Ag, Cu, or a metal containing any of these as a main component, and has a high melting point which does not melt even when the fuse device 1 is mounted on an external circuit board by a reflow furnace.

By laminating the high melting point metal layer 10 as an outer layer on the low melting point metal layer 9 as an inner layer, the fuse element 2 is prevented from being blown out as the fuse element 2 even when the reflow temperature exceeds the melting temperature of the low melting point metal layer 9. Therefore, the fuse device 1 can be efficiently mounted by reflow.

Further, the fuse element 2 is not melted even by self-heating while a predetermined rated current flows. When a current of a value higher than the rated value flows, melting starts from the melting point of the low melting point metal layer 9 by self-heating, and the current path between the terminals $2a$, $2b$ can be rapidly interrupted. For example, when the low melting point metal layer 9 is made of an Sn—Bi alloy or an In—Sn alloy, the fuse element 2 starts melting at a low temperature of about 140° C. or 120° C. In this case, by using an alloy containing 40% or more of Sn as a low melting point metal of the fuse element 2, the melted low melting point metal layer 9 erodes the high melting point metal layer 10 so that the high melting point metal layer 10 melts at a temperature lower than the melting temperature thereof. Therefore, the fuse element 2 can be blown out in a short time by utilizing the erosion action of the high melting point metal layer 10 by the low melting point metal layer 9.

In addition, since the fuse element 2 is formed by laminating the high melting point metal layer 10 on the low melting point metal layer 9 serving as an inner layer, the melting temperature can be significantly reduced compared with the conventional chip fuse made of a high melting point metal. Therefore, by forming the fuse element 2 wider in width and shorter in the current flowing direction than the high melting point metal element, it is possible to reduce the size of the fuse element 2 while significantly improving the current rating, and to suppress the influence of heat on connection parts to be connected with the circuit board. In addition, this fuse can be made smaller and thinner than the conventional chip fuse having the same current rating, and is excellent in rapid blowout property.

Moreover, the fuse element 2 can improve surge resistance (pulse resistance), in the case that an abnormally high voltage is instantaneously applied to an electric system in which the fuse device 1 is incorporated. For example, the fuse element 2 should not blow out even in the case of a current of 100 A flowing for a few milliseconds. In this regard, since a large current flowing in an extremely short time flows across the surface layer of a conductor (skin effect), and since the fuse element 2 is provided with a high melting point metal layer 10 such as Ag plating having a low resistivity as an outer layer, a current applied by a surge can be easily allowed to flow, and blowout due to self-heating can be prevented. Therefore, the fuse element 2 can significantly improve serge tolerance as compared with conventional fuses made of solder alloys.

The fuse element 2 can be manufactured by film forming techniques such as electrolytic plating techniques to deposit high melting point metal layer 10 on the surface of the low melting point metal layer 9. For example, the fuse element 2 can be efficiently manufactured by applying Ag plating to the surface of the solder foil or the thread solder. The fuse element 2 may have a laminated structure as shown in FIG. 6 (A) in which a high melting point metal layer 10 is laminated on the upper and lower surfaces of the low melting point metal layer 9, or may have a coated structure as shown in FIG. 6 (B) in which the outer periphery of the low melting point metal layer 9 is covered with the high melting point metal layer 10 formed by applying electrolytic plating or electroless plating to the low melting point metal layer 9 and cutting into a predetermined length so that the low melting point metal layer 9 is exposed at both ends. In the present technology, the structure of the fuse element 2 is not limited to that shown in FIG. 6.

It should be noted that, in the fuse element 2, it is preferable to form the volume of the low melting point metal layer 9 larger than the volume of the high melting point metal layer 10. The fuse element 2 can melt and blow out promptly by eroding the high melting point metal by melting the low melting point metal by self-heating. Therefore, in the fuse element 2, forming the volume of the low melting point metal layer 9 to be larger than the volume of the high melting point metal layer 10 promotes this erosive action, thereby promptly interrupting the path between the terminals $2a$, $2b$.

Deformation Restricting Portion

Figure 7:
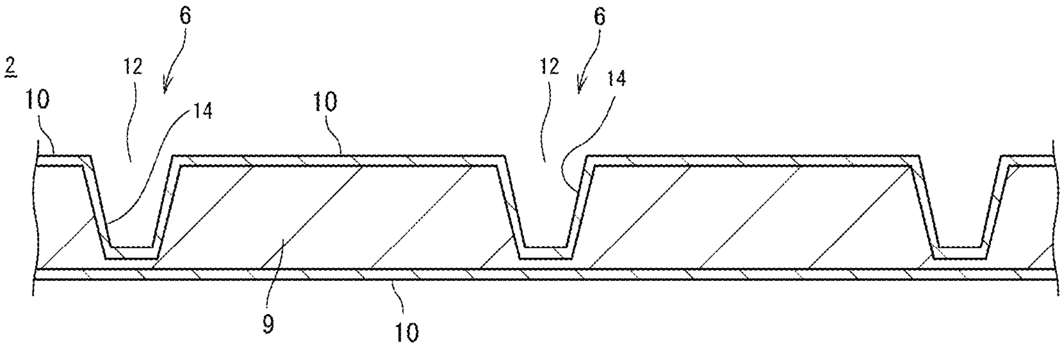
FIG. 7 is a cross-sectional view of a fuse element provided with a deformation restricting portion.

Further, as shown in FIG. 7, the fuse element 2 may be provided with a deformation restricting portion 6 for suppressing the flow of the melted low melting point metal to restrict deformation. As a result of increasing the area of the fuse element 2, even in the fuse element 2 having a high rating and low resistance, deformation due to flow of the low melting point metal during reflow heating can be prevented, and the fluctuation of the blowout properties can be suppressed.

The deformation restricting portion 6 is provided on the surface of the fuse element 2, and as shown in FIG. 7, at least a part of the side surface of one or more of holes 12 provided in the low melting point metal layer 9 is covered with the second high melting point metal layer 14 continuous to the high melting point metal layer 10. The holes 12 can be formed, for example, by piercing a sharp object such as a needle into the low melting point metal layer 9 or by pressing the low melting point metal layer 9 with a metal mold, among other methods. The shape of the hole 12 may have any shape such as an ellipse shape or a rectangular shape, among others. The holes 12 may be formed in a central portion to be a blow-out portion of the fuse element 2, or may be formed uniformly over the entire surface. By forming the holes 12 at a position corresponding to the blow-out portion, the amount of metal melted in the blow-out portion can be reduced, the resistance can be increased, and the interruption by heat can be performed more quickly.

As in the material constituting the high melting point metal layer 10, the material constituting the second high melting point metal layer 14 has a high melting point that does not melt by the reflow temperature. The second high melting point metal layer 14 is preferably formed of the same material as that of the high melting point metal layer 10 and formed simultaneously in the step of forming the high melting point metal layer 10 from the viewpoint of manufacturing efficiency.

Flux

In the fuse device 1, in order to prevent oxidation of the high melting point metal layer 10 or the low melting point metal layer 9, remove oxide during melting, and improve the fluidity of solder, the top surface and the back surface of the fuse element 2 may be coated with a flux (not shown).

By coating with the flux, even when an antioxidant film such as a Pb-free solder containing Sn as a main component is formed on the surface of the high melting point metal layer 10 of the outer layer, oxides of the antioxidant film can be removed, oxidation of the high melting point metal layer 10 can be effectively prevented, and blowout properties can be maintained and improved.

Fuse Blowout

Figure 8A:
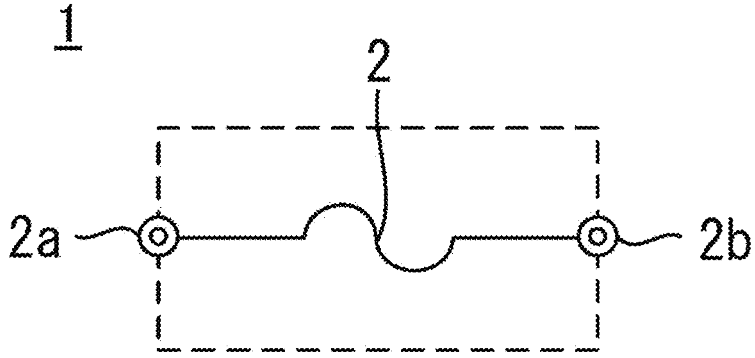
FIG. 8 shows the circuit configuration of a fuse device, with (A) illustrating a state before the fuse element is blown and (B) illustrating a state after the fuse element is blown.
Figure 8B:
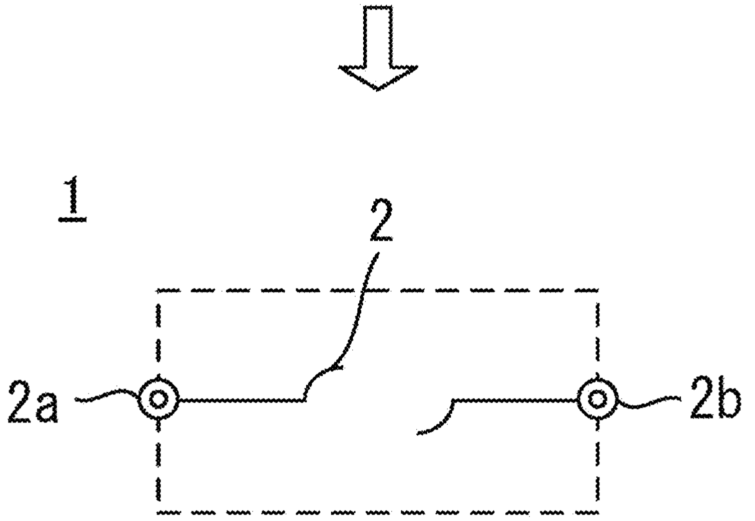

This fuse device 1 has a circuit configuration shown in FIG. 8 (A). The fuse device 1 is mounted on an external circuit via the terminals $2a$, $2b$, and is incorporated in a current path of the external circuit. The fuse device 1 is not blown by self-heating while a predetermined rated current flows through the fuse element 2. When an overcurrent exceeding the rated current flows through the fuse device 1, the fuse element 2 is blown out by the self-heating of the fuse element 2 accompanied with the generation of arc discharge to disconnect the path between the terminals $2a$, $2b$ thereby interrupting the current path of the external circuit (FIG. 8 (B)).

At this time, since the fuse device 1 has a resin portion 4 for capturing the melted and scattered material 11 of the fuse element 2 on at least a part of the inner wall surface 8*a* of the case 3 for housing the fuse element 2, the melted and scattered material 11 is captured in a discontinuous state by the resin portion 4, thereby preventing the material from continuously adhering to the inner wall surface 8*a* reaching both ends in the current flowing direction of the fuse element 2. Therefore, the fuse device 1 can prevent a situation where the melted and scattered material 11 of the melted and blown fuse element 2 continuously adheres to the inner wall surface 8*a* of the case 3 to cause a short-circuit between both ends of the fuse element 2.

Alternative Example of Fuse Device

Figure 9A:
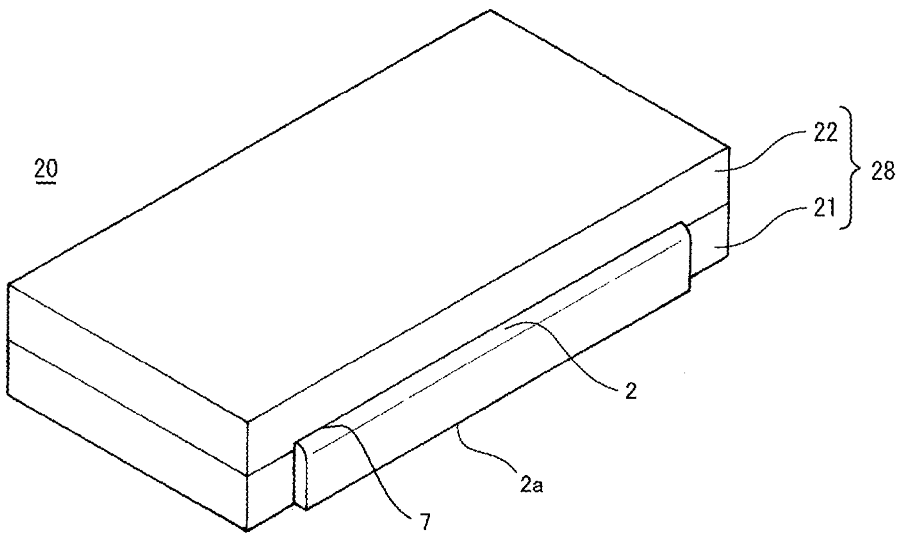
FIG. 9 shows a variation of a fuse device according to the present technology, with (A) being an external perspective view and (B) being a cross-sectional view.
Figure 9B:
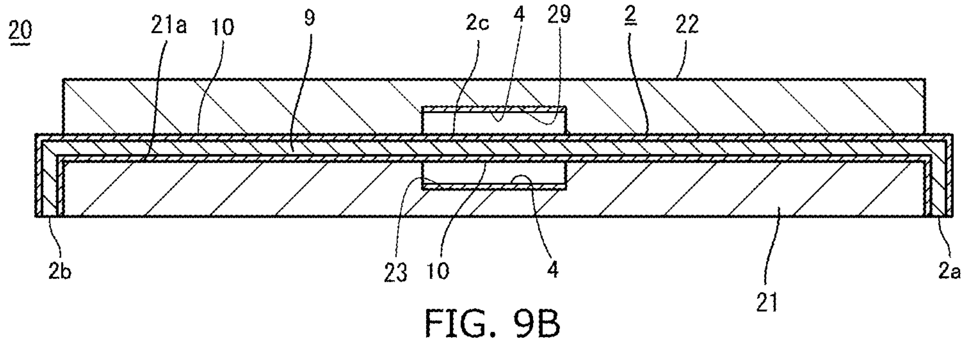

Next, an alternative example of the fuse device according to the present technology will be described. In the following description, the same components as those of the fuse device 1 are denoted by the same reference numerals and the details thereof are omitted. As shown in FIGS. 9 (A) and (B), a fuse device 20 according to the present technology includes: a base member 21; a fuse element 2 mounted on a surface 21*a* of the base member 21; and a cover member 22 covering the surface 21*a* of the base member 21 on which the fuse element 2 is mounted and constituting, together with the base member 21, an element housing 28 for housing the fuse element 2.

In the fuse device 20, the element housing 28 constituted of the base member 21 and the cover member 22 corresponds to the above-described case 3 for storing the fuse element 2. In the element housing 28, lead-out ports 7 for leading out a pair of terminals 2*a*, 2*b* are formed outside the element housing 28 formed by joining the base member 21 and the cover member 22. The fuse element 2 can be connected to a connection electrode of an external circuit through the terminals 2*a*, 2*b* led out from the lead-out ports 7.

The base member 21 may be formed of the same material as the case 3 described above, and is formed of an insulating member such as an engineering plastic such as a liquid crystal polymer, alumina, glass ceramics, mullite, or zirconia, among others. Other materials for a printed wiring board such as a glass epoxy board or a phenol board may be used for the base member 21.

As with the base member 21, the cover member 22 can be formed of the same material as that of the case 3 described above, and can be formed of an insulating member such as various engineering plastics or ceramics. The cover member 22 is connected to the base member 21 via an insulating adhesive, for example, or is connected to the base member 21 by providing a fitting mechanism.

Figure 10A:
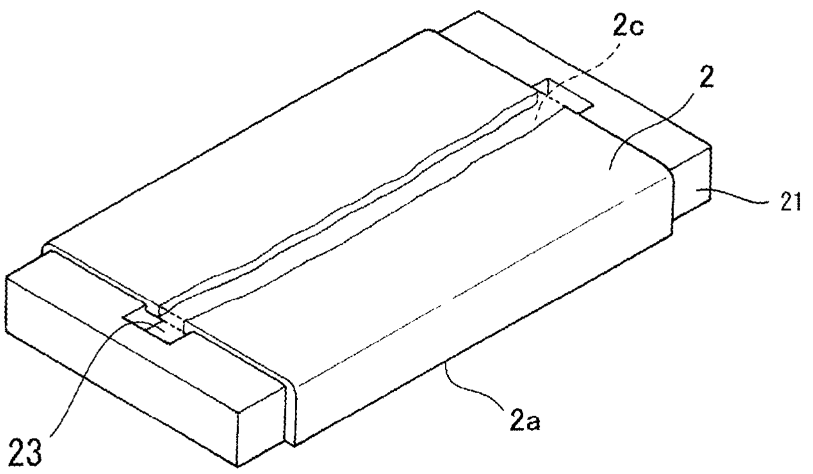
FIG. 10 is a view showing the variation of the fuse device shown in FIG. 9 after the fuse element is blown, with (A) being an external perspective view and (B) being a cross-sectional view.
Figure 10B:
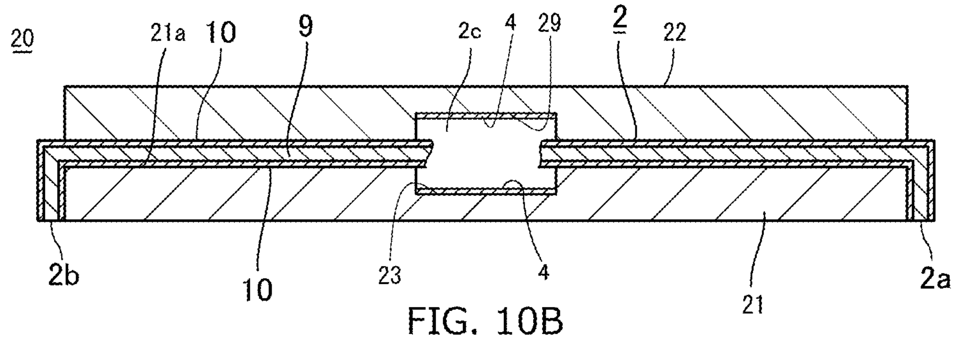

As shown in FIG. 9 (B), the base member 21 has a groove 23 formed on the surface 21*a* on which the fuse element 2 is mounted. The cover member 22 also has a groove 29 formed opposite to the groove 23. As shown in FIGS. 10 (A) and (B), the grooves 23, 29 are spaces in which the fuse element 2 melts and blows out, and the portion of the fuse element 2 in the grooves 23, 29 is a blow-out portion 2*c* to be blown by relatively increased temperature since the air in contact with the blow-out portion 2*c* has a thermal conductivity lower than the base member 21 and the cover member 22 in contact with the other portions of the fuse element.

The base member 21 is provided with the resin portion 4 formed at least partially on the inner wall surface of the groove 23, and the cover member 22 is provided with the resin portion 4 formed at least partially on the inner wall surface of the groove 29. Since the fuse element 2 of the fuse device 20 is covered with the grooves 23 and 29, even in the case of self-heat generation interruption accompanied with the generation of arc discharge due to the overcurrent, the melted metal is captured by the resin portion 4 and can be prevented from scattering to the surrounding. Further, in the fuse device 20, the melted and scattered material 11 of the fuse element 2 is captured in a discontinuous state by the resin portion 4, thereby preventing the material from being continuously adhered to the inner wall surface reaching both ends in the current flowing direction of the fuse element 2. Therefore, the fuse device 20 can prevent a situation where the melted and scattered material 11 of the melted and blown fuse element 2 continuously adheres to the inner wall surfaces of the grooves 23, 29 to cause a short-circuit between both ends of the fuse element 2.

The resin portion 4 is continuously formed along the longitudinal direction of the grooves 23, 29, faces over the entire width of the fuse element 2, and has a length equal to or longer than the entire width of the fuse element 2. Preferably, the resin portion 4 is also formed on the bottom surfaces of the grooves 23, 29 over their entire length in the longitudinal direction and on the respective side surfaces adjacent to the bottom surfaces on the four sides.

It should be noted that a conductive adhesive or solder may be appropriately interposed between the base member 21 and the fuse element 2. In the fuse device 20, mutual adhesiveness is enhanced by connecting the base member 21 and the fuse element 2 through an adhesive or solder and heat is more efficiently transmitted to the base member 21, thereby relatively overheating and blowing out the blow-out portion 2*c*.

Figure 11:
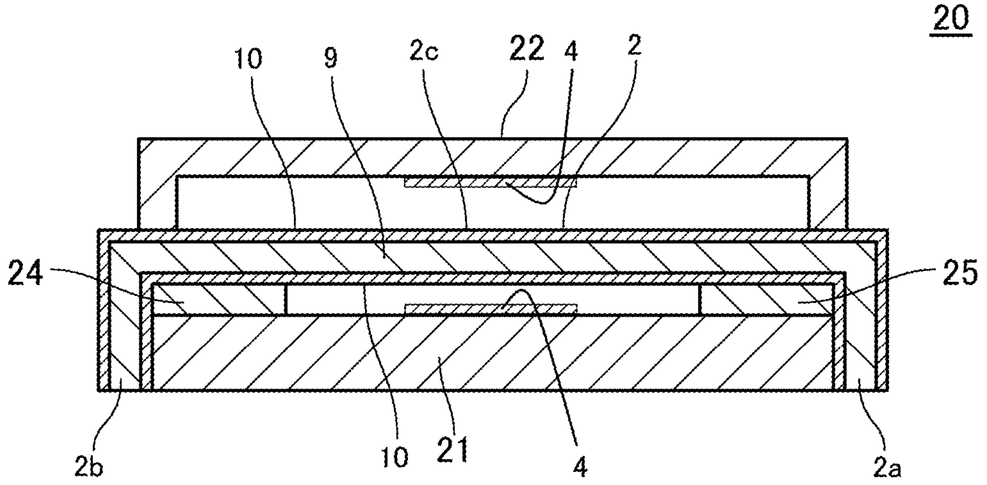
FIG. 11 is a cross-sectional view showing a variation of a fuse device according to the present technology.

In the fuse device 20, instead of providing the groove 23 in the base member 21, as shown in FIG. 11, a first electrode 24 and a second electrode 25 may be provided on the surface 21*a* of the base member 21. Each of the first and second electrodes 24, 25 may be formed of a pattern of conductive material such as Ag or Cu, and a protective layer such as Sn plating, Ni/Au plating, Ni/Pd plating, and Ni/Pd/Au plating may be provided on the surface as an anti-oxidation measure.

The fuse element 2 is connected to the first and second electrodes 24, 25 through solder for connection. By connecting the fuse element 2 to the first and second electrodes 24, 25, the heat radiation effect in the parts excluding the blow-out portion 2*c* are enhanced, and the blow-out portion 2*c* can be more effectively heated and fused.

In the configuration shown in FIG. 11, the base member 21 and the cover member 22 are also provided with the resin portion 4. In this regard, although an air gap is preferably formed between the resin portion 4 and the fuse element 2, even when the resin portion 4 is in contact with the fuse element 2, the blow-out portion 2*c* can be relatively overheated and fused since the resin portion 4 has a thermal conductivity lower than the first and second electrodes 24, 25. In the configuration shown in FIG. 11, the fuse device 20 may also have the groove 23 provided in the base member 21, the groove 29 provided in the cover member 22, and the resin portions 4 provided in the grooves 23, 29, respectively.

Figure 12:
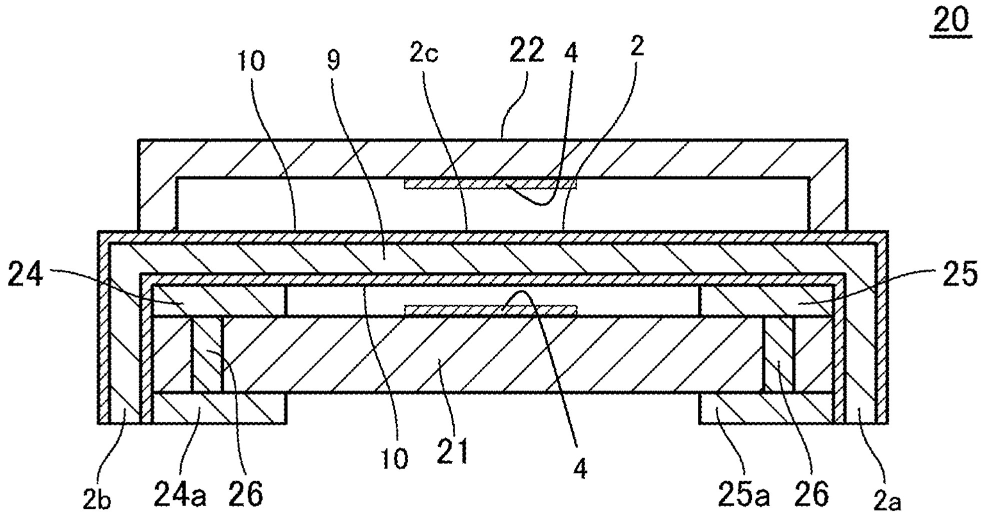
FIG. 12 is a cross-sectional view showing a variation of a fuse device according to the present technology.

Instead of providing the fuse element 2 with the terminals 2*a*, 2*b*, or in addition to the terminals 2*a*, 2*b* as shown in FIG. 12, the fuse device 20 may be provided with first and second external connection electrodes 24*a*, 25*a* electrically connected to the first and second electrodes 24, 25 on the back surface 21*b* of the base member 21. The first and second electrodes 24, 25 are electrically connected to the first and second external connection electrodes 24*a*, 25*a* through a through-hole 26 penetrating the base member 21 or a castellation, among others. The first and second external connection electrodes 24*a*, 25*a* are also formed by patterns of a conductive material such as Ag and Cu, and a protective layer such as Sn plating, Ni/Au plating, Ni/Pd plating, and Ni/Pd/Au plating may be provided on the surfaces as an anti-oxidation measures. The fuse device 20 is mounted onto a current path of an external circuit board via the first and second external connection electrodes 24*a*, 25*a* in place of the terminals 2*a*, 2*b* or together with the terminals 2*a*, 2*b*.

In the fuse device 20 shown in FIGS. 11 and 12, the fuse element 2 is mounted separately from the surface 21*a* of the base member 21. Therefore, the fuse device 20 fuses between the first and second electrodes 24, 25 without the melted metal biting into the base member 21 even when the fuse element 2 is fused, and can reliably maintain the insulation resistance between the terminals 2*a*, 2*b* and between the first and second electrodes 24, 25 with the help of the effect of the resin portion 4.

In the fuse device 20, in order to prevent oxidation of the high melting point metal layer 10 or the low melting point metal layer 9, to remove oxide in melting, and to improve the fluidity of solder, a flux (not shown) may be coated on the front surface and/or the back surface of the fuse element 2.

By coating with the flux, even when an antioxidant film such as a Pb-free solder containing Sn as a main component is formed on the surface of the high melting point metal layer 10 of the outer layer, oxides of the antioxidant film can be removed, oxidation of the high melting point metal layer 10 can be effectively prevented, and blowout properties can be maintained and improved.

Terminal

As shown in FIG. 9, in the fuse device 20, the terminals 2*a*, 2*b* of the fuse element 2 led out to the outside of the case 3 may be bent along the side surface of the base member 21. By bending the terminals 2*a*, 2*b*, the fuse element 2 is fitted to the side surface of the base member 21 and the terminals 2*a*, 2*b* are directed toward the bottom surface side of the base member 21. Thus, the fuse device 1 can be surface-mounted by using the bottom surface of the base member 21 as a mounting surface and connecting the terminals 2*a*, 2*b* to the connection electrodes of the external circuit board.

Further, by forming the terminals 2*a*, 2*b* in the fuse element 2, the fuse device 20 does not need to have another electrode on the surface of the base member 21 on which the fuse element 2 is mounted, and also does not need to have another external connection electrode connected to the electrode on the back surface of the base member 21, so that the manufacturing process can be simplified, and the current rating can be regulated by the fuse element 2 itself without being restricted by the conduction resistance between electrodes of the base member 21 and external connection electrodes, thereby improving the current rating.

The terminals 2*a*, 2*b* are formed by bending the ends of the fuse element 2 mounted on the surface of the base member 21 along the side surfaces of the base member 21, and further bending one or more times to the outside or inside as appropriate. Thus, in the fuse element 2, bent portions are formed between a substantially flat main surface and another surface along which the bent ends extend.

When the terminals 2*a*, 2*b* are exposed to the outside of the element and the fuse device 20 is mounted on the external circuit board, the terminals 2*a*, 2*b* are connected to connection electrodes formed on the external circuit board by means such as solder, whereby the fuse element 2 is incorporated into the external circuit.

Heat-Generating Element

Figure 13A:
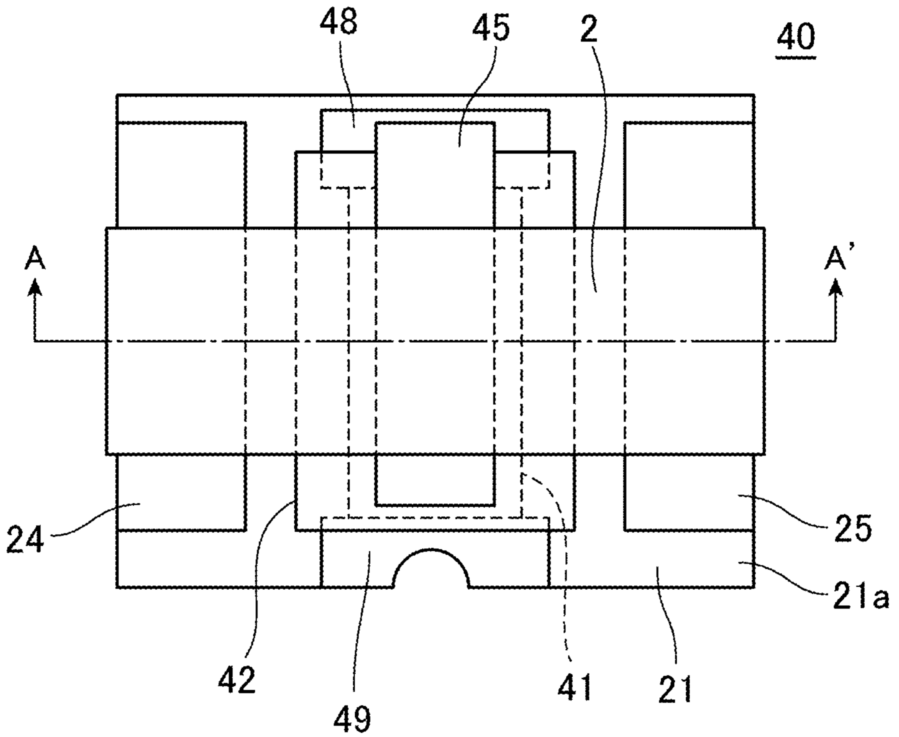
FIG. 13 shows a variation of a fuse device according to the present technology, with (A) being a top view showing a base member having a heat-generating element on which a fuse element is mounted, and (B) being a cross-sectional view.
Figure 13B:
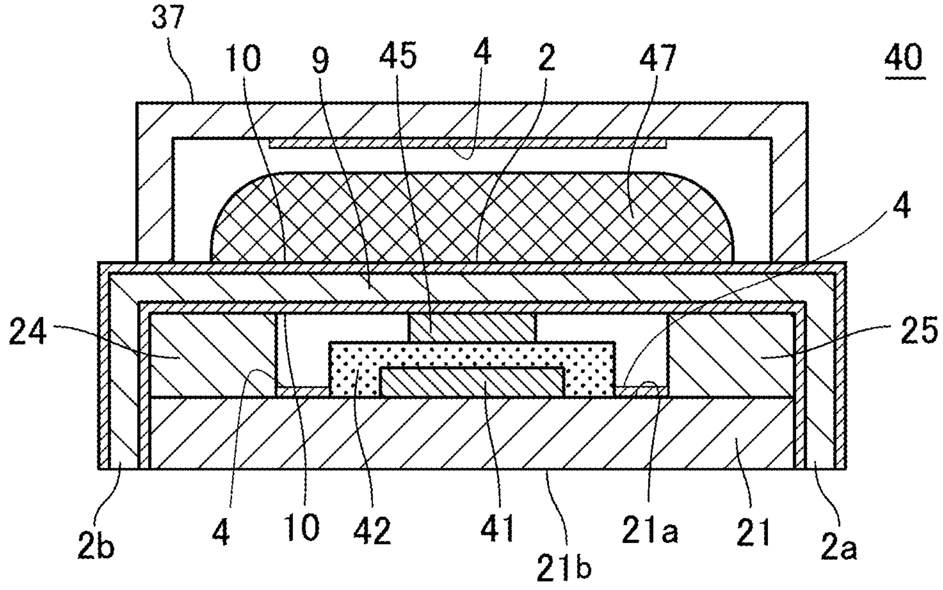

As shown in FIGS. 13 (A) and (B), the technology can also be applied to a fuse device 40 having a base member 21 provided with a heat-generating element 41. In the following description, the same members as those of the fuse devices 1 and 20 are denoted by the same reference numerals and details thereof are omitted. The fuse device 40 according to the present invention includes: a base member 21; a heat-generating element 41 laminated on the base member 21 and covered with an insulating member 42; a first electrode 24 and a second electrode 25 formed on both ends of the base member 21; a heat-generating element extraction electrode 45 laminated on the base member 21 so as to overlap with the heat-generating element 41 and electrically connected to the heat-generating element 41; and a fuse element 2 both ends of which are connected to the first and second electrodes 24, 25, respectively, and a central portion of which is connected to the heat-generating element extraction electrode 45. The fuse device 40 forms an element housing 28 by bonding or fitting the base member 21 and the cover member 22 to each other. In addition, as described above, the cover member 22 includes the above-mentioned resin portion 4 formed on at least a part of the inner wall surface.

On the surface 21*a* of the base member 21, the first and second electrodes 24, 25 are formed at mutually opposite ends. The first and second electrodes 24, 25 interrupt the current path between the terminals 2*a*, 2*b* when the heat-generating element 41 is energized to generate heat and melted fuse elements 2 gathers together due to the wettability thereof.

The heat-generating element 41 is made of an electrically conductive material that generates heat when energized, and is made of, for example, nichrome, W, Mo, Ru, or a material containing these. The heat-generating element 41 can be formed by, for example, forming a paste by mixing powder of these alloys, compositions, or compounds with a resin binder, patterning the paste on the base member 21 by using a screen printing technique, and baking the paste.

In the fuse device 40, a heat-generating element 41 is covered with an insulating member 42, and a heat-generating element extraction electrode 45 is formed so as to face the heat-generating element 41 via the insulating member 42. The fuse element 2 is connected to the heat-generating element extraction electrode 45, whereby the heat-generating element 41 overlaps the fuse element 2 via the insulating member 42 and the heat-generating element extraction electrode 45. The insulating member 42 is provided to protect and insulate the heat-generating element 41 and efficiently transmitting the heat of the heat-generating element 41 to the fuse element 2, and is made of, for example, a glass layer.

The heat-generating element 41 may be formed inside the insulating member 42 laminated on the base member 21. The heat-generating element 41 may be formed on the back surface 21*b* opposite to the front surface 21*a* of the base member 21 on which the first and second electrodes 24, 25 are formed, or may be formed adjacent to the first and second electrodes 24, 25 on the front surface 21*a* of the base member 21. The heat-generating element 41 may be formed inside the base member 21.

Further, one end of the heat-generating element 41 is connected to the heat-generating element extraction electrode 45 via the first heat-generating element electrode 48 formed on the surface 21*a* of the base member 21, and the other end is connected to the second heat-generating element electrode 49 formed on the surface 21*a* of the base member 21. The heat-generating element extraction electrode 45 is connected to the first heat-generating element electrode 48, overlapped with the heat-generating element 41, laminated on the insulating member 42, and connected to the fuse element 2. Thus, the heat-generating element 41 is electrically connected to the fuse element 2 via the heat-generating element extraction electrode 45. It should be noted that arranging the heat-generating element extraction electrode 45 so as to overlap with the heat-generating element 41 via the insulating member 42 not only allows the fuse element 2 to be melt but also promotes gathering of melted conductor.

Figure 14B:
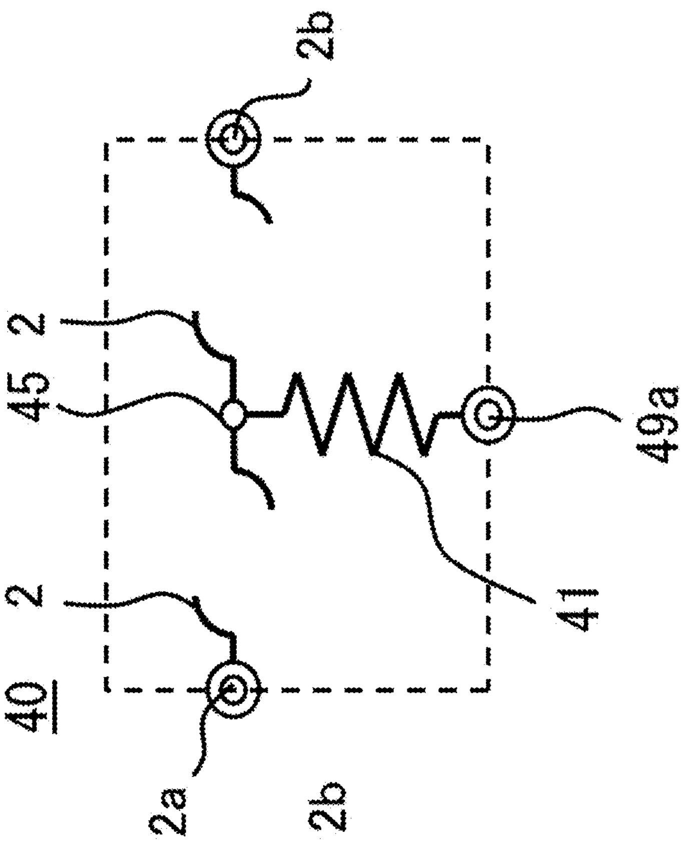
FIG. 14 is a circuit diagram of the fuse device of FIG. 13, with (A) illustrating a state before the fuse element is blown and (B) illustrating a state after the fuse element is blown.
Figure 14A:
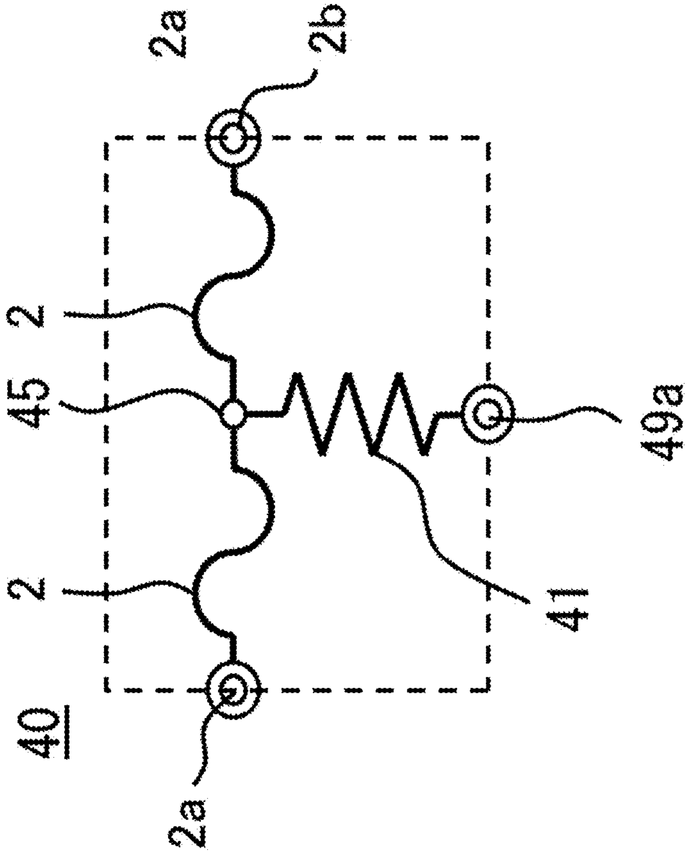
Figure 15A:
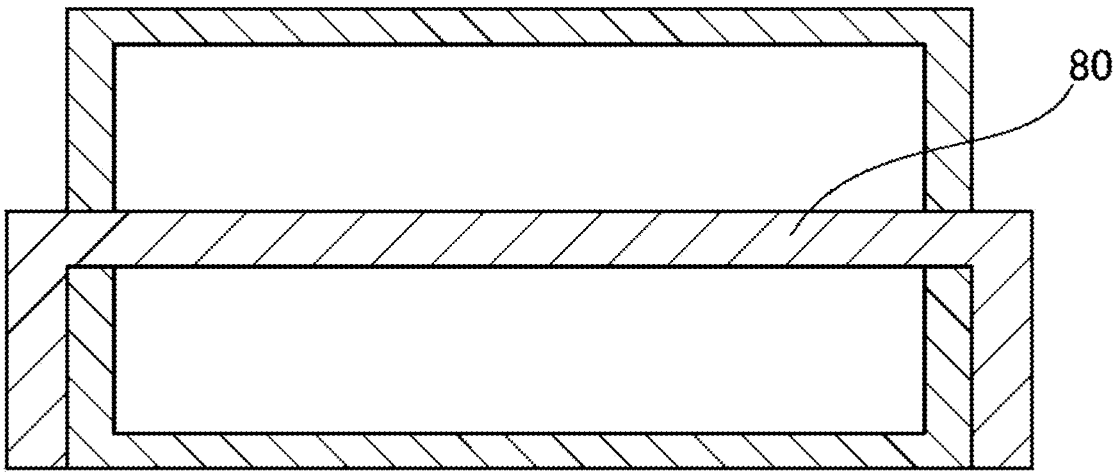
FIG. 15 is a cross-sectional view of a conventional fuse device, with (A) illustrating a state before the fuse element is blown and (B) illustrating a state after the fuse element is blown.
Figure 15B:
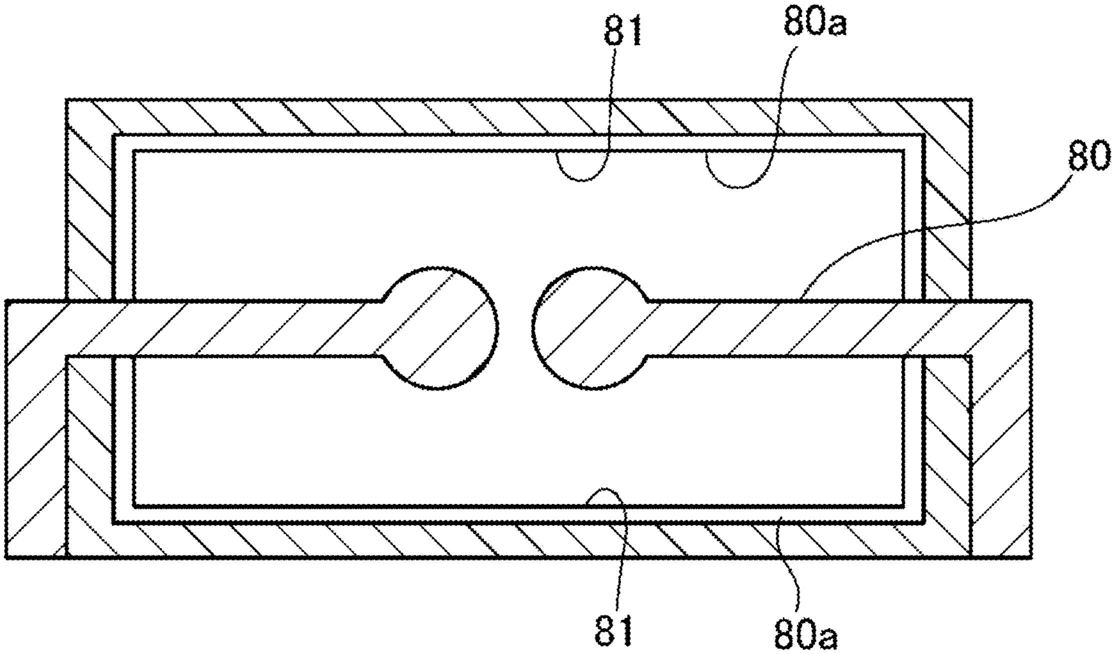

The second heat-generating element electrode 49 is formed on the front surface 21*a* of the base member 21, and is continuous with a heat-generating element power supply electrode 49*a* formed on the back surface 21*b* of the base member 21 through a castellation (see, FIG. 14 (A)).

In a fuse device 40, the fuse element 2 is connected from the first electrode 24 to the second electrode 25 via the heat-generating element extraction electrode 45. The fuse element 2 is connected to the first and second electrodes 24, 25 and the heat-generating element extraction electrode 45 via a connection material such as solder for connection.

Flux

Further, in the fuse device 40, in order to prevent oxidation and sulfidation of the high melting point metal layer 10 or the low melting point metal layer 9, remove oxide and sulfide during melting, and improve the fluidity of solder, the top surface and the back surface of the fuse element 2 may be coated with a flux 47. Coating with the flux 47 not only improves the wettability of the low melting point metal layer 9 (for example, solder) but also removes oxides and sulfides generated while the low melting point metal is melted, and improves blowout properties by the erosion action on the high melting point metal (for example, Ag) during actual use of the fuse device 40.

Further, by coating with the flux 47, even when an antioxidant film such as Pb-free solder containing Sn as a main component is formed on the surface of the outermost high melting point metal layer 10, oxides of the antioxidant film can be removed, oxidation and sulfidation of the high melting point metal layer 10 can be effectively prevented, and blowout properties can be maintained and improved.

It is preferable that the first and second electrodes 24, 25, the heat-generating element extraction electrode 45, and the first and second heat-generating element electrodes 48, 49 are formed by a conductive pattern such as of Ag or Cu, and a protective layer such as Sn plating, Ni/Au plating, Ni/Pd plating, Ni/Pd/Au or other plating is formed on the surface as appropriate. This prevents oxidation and sulfidation of the surface and suppresses erosion of the first and second electrodes 24, 25 as well as the heat-generating element extraction electrode 45 caused by connecting material such as solder used to connect the fuse element 2.

Further, the fuse device 40 constitutes a part of a current path to the heat-generating element 41 by connecting the fuse element 2 to the heat-generating element extraction electrode 45. Therefore, when the fuse element 2 melts and the connection with the external circuit is interrupted, the fuse device 40 also interrupts the current path to the heat-generating element 41, so that heat generation can be stopped.

Circuit Diagram

The fuse device 40 to which the present invention is applied has a circuit configuration as shown in FIG. 14. Thus, the fuse device 40 has a circuit configuration in which the fuse element 2 is connected in series between the pair of terminals 2*a*, 2*b* via the heat-generating element extraction electrode 45, and the heat-generating element 41 is connected to the fuse element 2 via a connection point through which current passes to generate heat to blow the fuse element 2. In the fuse device 40, the terminals 2*a*, 2*b* provided at both ends of the fuse element 2 and the heat-generating element power supply electrode 49*a* connected to the second heat-generating element electrode 49 are connected to an external circuit board. Thus, in the fuse device 40, the fuse element 2 is connected in series to the current path of the external circuit via the terminals 2*a*, 2*b*, and the heat-generating element 41 is connected to the current control element provided in the external circuit via a heat-generating element power supply electrode 49*a*.

Fuse Blowout

When the fuse device 40 having such a circuit configuration needs to interrupt the current path of the external circuit, a current control element provided in the external circuit energizes the heat-generating element 41. As a result, in the fuse device 40, the fuse element 2 incorporated in the current path of the external circuit is melted by the heat generated by the heat-generating element 41, and the highly wettable heat-generating element extraction electrode 45 and the first and second electrodes 24, 25 attract the melted conductor of the fuse element 2 to blow out the fuse element 2. As a result, the fuse element 2 is reliably blown between the terminal 2*a* and the heat-generating element extraction electrode 45, and between the heat-generating element extraction electrode 45 and the terminal 2*b*, thereby reliably interrupting the current path of the external circuit (FIG. 14 (B)). Moreover, blowing the fuse element 2 also interrupts the power supply to the heat-generating element 41.

During this, heat generation of the heat-generating element 41 starts to melt the fuse element 2 from the melting point of the low melting point metal layer 9 having a melting point lower than that of the high melting point metal layer 10 and the low melting point metal layer 9 begins to erode the high melting point metal layer 10. Thus, in the fuse element 2, the high melting point metal layer 10 is melted at a temperature lower than the melting point thereof by utilizing the erosion action of the high melting point metal layer 10 by the low melting point metal layer 9, and the current path of the external circuit can be rapidly interrupted.

As described above, the fuse device 40 includes the resin portion 4 formed on at least a part of the inner wall surface of the cover member 22. Since the fuse element 2 of the fuse device 40 is covered with the cover member 22, even in the case of self-heat generation interruption accompanied with the generation of arc discharge due to the overcurrent, the melted metal is captured by the cover member 22 and can be prevented from scattering to the surrounding. Further, in the fuse device 40, the melted and scattered material 11 of the fuse element 2 is captured in a discontinuous state by the resin portion 4, thereby preventing the material from being continuously adhered to the inner wall surface reaching both ends in the current flowing direction of the fuse element 2. Therefore, the fuse device 40 can prevent a situation where the melted and scattered material 11 of the melted and blown fuse element 2 continuously adheres to the inner wall surface of the cover member 22 to cause a short-circuit between both ends of the fuse element 2.

It should be noted that, in the fuse device 40, the resin portion 4 may also be formed between the first electrode 24 of the base member 21 and the insulating member 42, and between the second electrode 25 of the base member 21 and the insulating member 42. By forming the resin portion 4 between the insulating member 42 and the first and second electrodes 24, 25, even when the melted and scattered material 11 of the fuse element 2 adheres to the region, it can be captured by the resin portion 4.

It should be noted that, although the fuse devices 20, 40 described above are surface-mounted on an external circuit board by connecting the terminals 2*a*, 2*b* of the fuse element 2 to external connection terminals provided on the external circuit board by soldering, the fuse devices 1, 40 according to this technology can be used with connections other than surface mounting.

For example, in the fuse devices 20, 40 according to the present technology, the terminals 2*a*, 2*b* of the fuse element 2 may be connected to a metal plate serving as an external connection terminal capable of supporting a large current. The terminals 2*a*, 2*b* of the fuse element 2 may be connected to a metal plate with a connecting material such as solder, the terminals 2*a*, 2*b* may be held between clamp terminals connected to a metal plate, or the terminals 2*a*, 2*b* or the clamp terminals may be fixed to a metal plate with screws having conductivity.

REFERENCE SIGNS LIST

1 fuse device, 2 fuse element, 2*a* terminal, 2*b* terminal, 2*c* blow-out portion, 3 case, 4 resin portion, 6 deformation restricting portion, 7 lead-out port, 8 housing space, 8*a* inner wall surface, 9 low melting point metal layer, 10 high melting point metal layer, 11 melted and scattered material, 12 hole, 14 second high melting point metal layer, 20 fuse device, 21 base member, 21*a* surface, 21*b* back surface, 22 cover member, 23 groove, 24 first electrode, 24*a* first external connection electrode, 25 second electrode, 25*a* second external connection electrode, 26 through hole, 28 element housing, 29 groove, 40 fuse device, 41 heat-generating element, 42 insulating member, 45 heat-generating element extraction electrode, 47 flux, 48 first heat-generating element electrode, 49 second heat-generating element electrode, 49*a* heat-generating element power supply electrode

The invention claimed is:

1. A fuse device comprising:

a fuse element; and a case for housing the fuse element, wherein the case includes a resin portion having a surface to be melted by heat accompanying blowout of the fuse element on at least a part of an inner wall surface facing an inside for housing the fuse element, and wherein the resin portion is present over an entire circumference of the inner wall surface and surrounds the fuse element, wherein the fuse element is mounted in contact with the inner wall surface of the case and is in contact with at least a part of the resin portion, wherein the case has a groove portion in which the fuse element comes into contact with air on a part of the inner wall surface, wherein the resin portion is formed from only one type of resin material, selected from the group consisting of nylon 46, nylon 4T, nylon 10T, PFA, FEP, ETFE, EFEP, CPT, and PCTFE, wherein the fuse device is configured and the resin material is selected such that upon blowout of the fuse element, the resin material is melted and at least one void is formed in a surface of the resin portion, and melted and scattered material of the fuse element is captured in the at least one void of the resin portion and is thereby prevented from continuously adhering to the inner wall surface and reaching both ends of an energization direction of the fuse element, thereby preventing a situation in which both ends of the blown-out fuse element are short-circuited, and wherein the resin portion is made of a material having a tracking resistance of 250 V or more.

2. The fuse device according to claim 1, wherein the case is formed of a ceramic material.

3. The fuse device according to claim 1, wherein the resin portion is made of a material having a tracking resistance of 600 V or more.

4. The fuse device according to claim 1, wherein the resin portion is made of a material having a melting point of 400° C. or less.

5. The fuse device according to claim 1, wherein the resin portion is made of a material having a thermal conductivity of 1 W/m*K or less.

6. The fuse device according to claim 1, wherein the case supports two positions spaced apart in a current flowing direction of the fuse element to support a section of the fuse element defined between the two positions in a bridge-like manner.

7. The fuse device according to claim 6, wherein the resin portion is formed in the case so as to interrupt the section defined between the two positions of the inner wall in a direction orthogonal to the current flowing direction of the fuse element.

8. The fuse device according to claim 1, wherein the resin portion is formed on an entire surface of the inner wall surface.

9. The fuse device according to claim 1, wherein the fuse element is a laminate having an inner layer of a low melting point metal layer and an outer layer of a high melting point metal layer.

10. The fuse device according to claim 1, further comprising a heat-generating element, wherein the fuse element is blown by heat generated by energizing the heat-generating element.

11. The fuse device according to claim 1, wherein the groove portion comprises two groove portions facing each other and sandwiching the fuse element, and wherein the resin portion is provided in the groove potions.

12. The fuse device according to claim 1, wherein the resin portion is present on an entire inner wall surface of the case.

13. The fuse device according to claim 1, wherein the resin portion is formed from only one type of resin material, selected from the group consisting of PFA, FEP, ETFE, EFEP, CPT, and PCTFE.

14. A fuse device comprising:

a fuse element; and a case for housing the fuse element, wherein the case includes a resin portion for capturing melted and scattered material of the fuse element on at least a part of an inner wall surface facing an inside for housing the fuse element, wherein the fuse element is mounted in contact with the inner wall surface of the case and is in contact with at least a part of the resin portion, wherein the case has a groove portion in which the fuse element comes into contact with air on a part of the inner wall surface, wherein the resin portion is formed from only one type of resin material, selected from the group consisting of nylon 46, nylon 4T, nylon 10T, PFA, FEP, ETFE, EFEP, CPT, and PCTFE, wherein the fuse device is configured and the resin material is selected such that upon blowout of the fuse element, the resin material is melted and at least one void is formed in a surface of the resin portion, and melted and scattered material of the fuse element is captured in the at least one void of the resin portion and is thereby prevented from continuously adhering to the inner wall surface and reaching both ends of an energization direction of the fuse element, thereby preventing a situation in which both ends of the blown-out fuse element are short-circuited, and wherein the resin portion is made of a material having a tracking resistance of 250 V or more.

15. The fuse device according to claim 14, wherein the melted and scattered material captured by the resin portion is discontinuous.

16. The fuse device according to claim 14, wherein the case is formed of a ceramic material.

17. The fuse device according to claim 14, wherein the resin portion is made of a material having a tracking resistance of 600 V or more.

18. The fuse device according to claim 14, wherein the resin portion is made of a material having a melting point of 400° C. or less.

19. The fuse device according to claim 14, wherein the resin portion is made of a material having a thermal conductivity of 1 W/m*K or less.

20. The fuse device according to claim 14, wherein the case supports two positions spaced apart in a current flowing direction of the fuse element to support a section of the fuse element defined between the two positions in a bridge-like manner.

21. The fuse device according to claim 20, wherein the resin portion is formed in the case so as to interrupt the section defined between the two positions of the inner wall in a direction orthogonal to the current flowing direction of the fuse element.

22. The fuse device according to claim 14, wherein the resin portion is formed on an entire surface of the inner wall surface.

23. The fuse device according to claim 14, wherein the fuse element is a laminate having an inner layer of a low melting point metal layer and an outer layer of a high melting point metal layer.

24. The fuse device according to claim 14, further comprising a heat-generating element, wherein the fuse element is blown by heat generated by energizing the heat-generating element.

25. The fuse device according to claim 14, wherein the groove portion comprises two groove portions facing each other and sandwiching the fuse element, and wherein the resin portion is provided in the groove potions.

26. The fuse device according to claim 14, wherein the resin portion is formed from only one type of resin material, selected from the group consisting of PFA, FEP, ETFE, EFEP, CPT, and PCTFE.

* * * * *